Dec. 25, 1934.  W. D. YERRICK  1,985,269
PREHEATING APPARATUS
Filed Feb. 5, 1931    4 Sheets-Sheet 1

INVENTOR.
William D. Yerrick
BY Nathaniel Frucht
his ATTORNEY

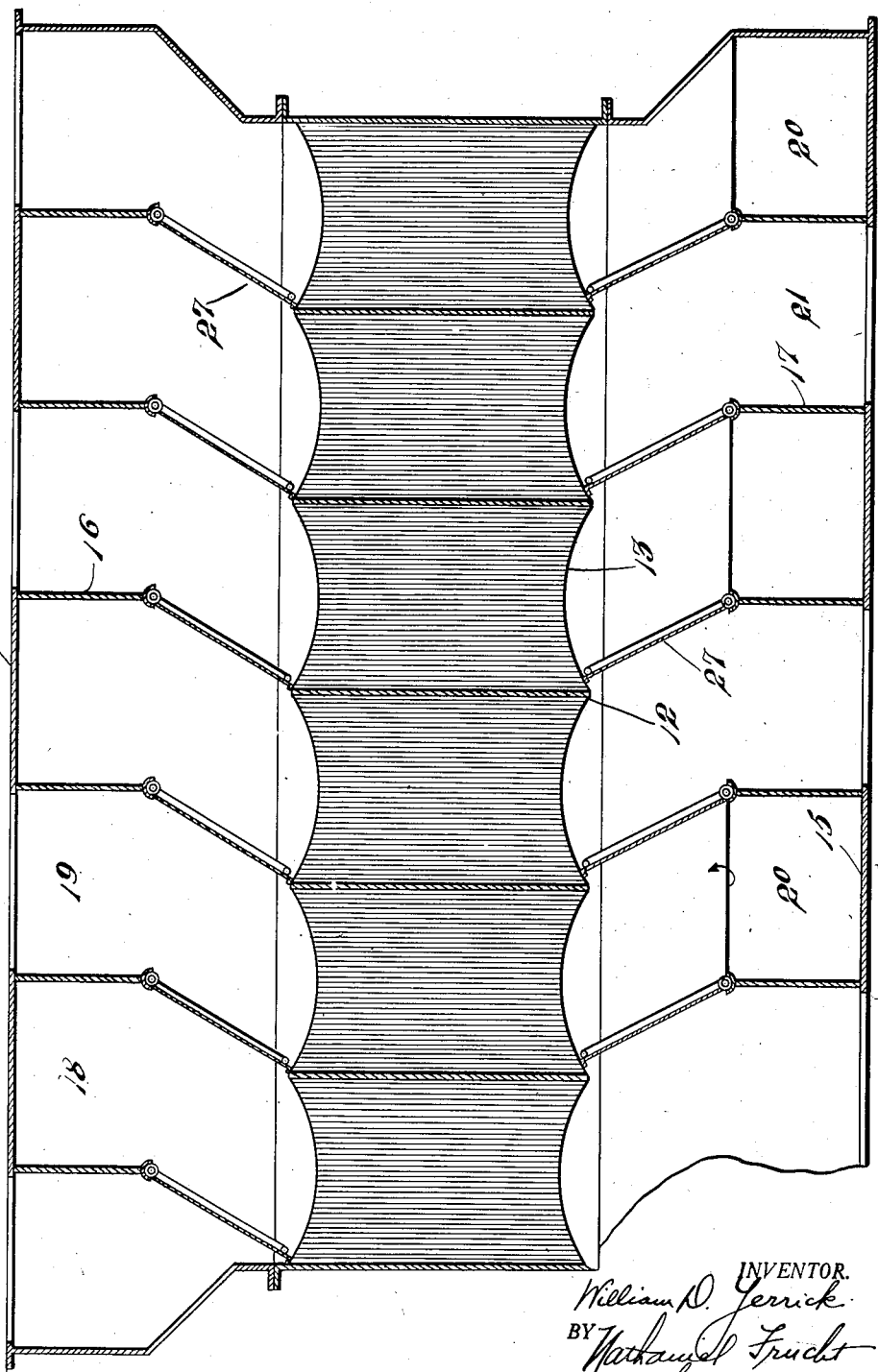

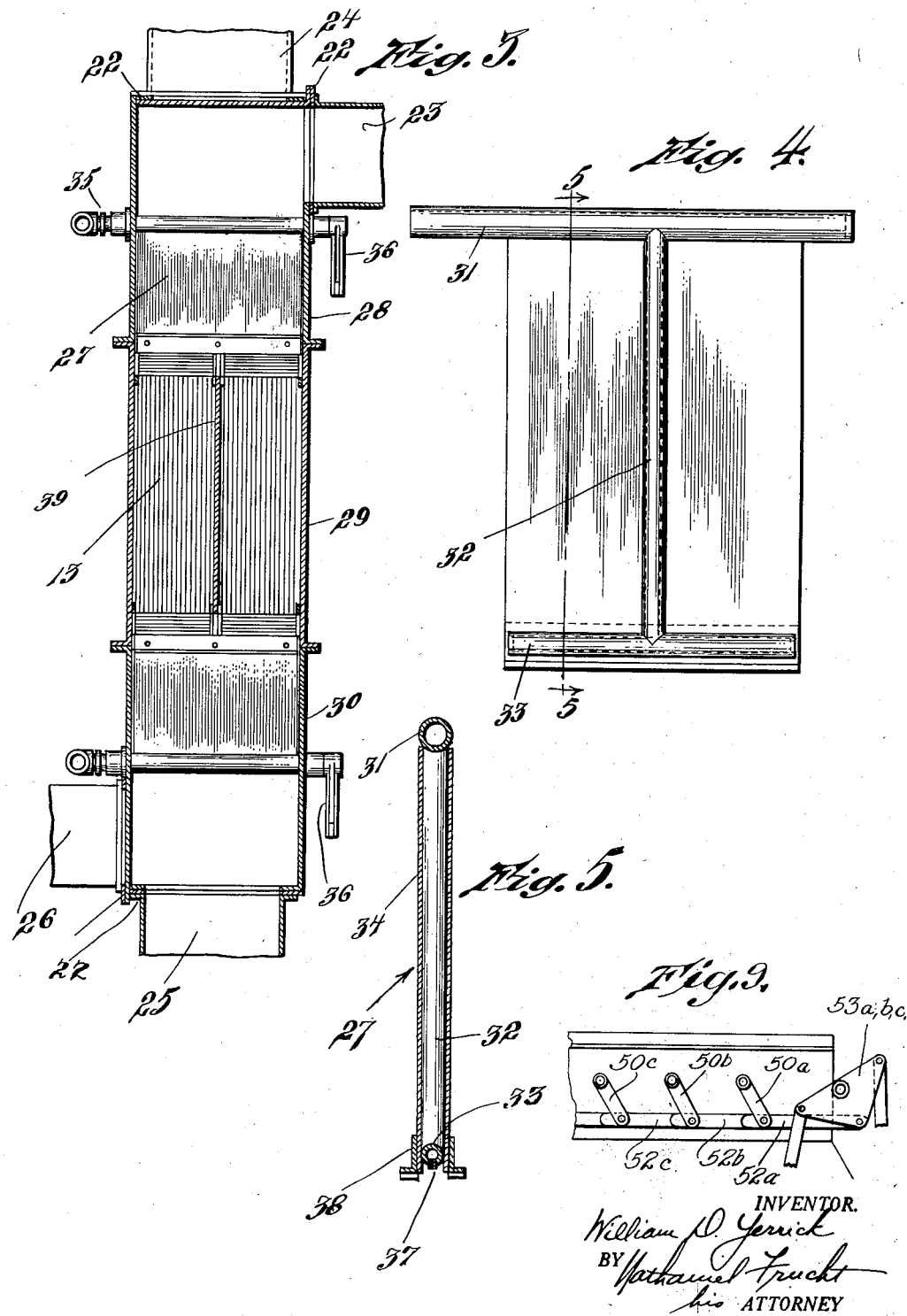

Dec. 25, 1934.   W. D. YERRICK   1,985,269
PREHEATING APPARATUS
Filed Feb. 5, 1931   4 Sheets-Sheet 4

INVENTOR.
William D. Yerrick
BY Nathaniel Frucht
his ATTORNEY

Patented Dec. 25, 1934

1,985,269

UNITED STATES PATENT OFFICE 1,985,269

PREHEATING APPARATUS

William D. Yerrick, Wellsville, N. Y., assignor to Air Preheater Corporation, a corporation of New York Application February 5, 1931, Serial No. 513,659

4 Claims. (Cl. 257—6)

My present invention relates to heat exchangers, and has particular reference to heat exchangers of the regenerative type suitable for preheating air for power plant and industrial plant use.

Modern power and industrial plant development has stressed efficiency of operation, and has therefore developed control apparatus sensitive to very slight changes in operating conditions. It therefore results that slight changes in the supply of heated air, or interruptions in the supply, produce undesirable operation effects. It has therefore become advisable to devise auxiliary apparatus, such as air preheaters, which will ensure a substantially constant flow of heated air, with substantially no interruption.

The devising of air preheaters with substantially constant flow has been difficult, however, due to the limited amount of available space in the modern power or industrial plant, and the necessity for increasing the preheater loading as the plant load is increased. The preferred preheater construction is therefore one to which units may be readily added or removed as required, and which has its regenerative material positioned to facilitate inspection, replacement and repair.

A further difficulty in planning air preheaters for modern plants resides in the tendency to utilize cheaper fuel in order to decrease operating costs; low priced fuels have more dust, and form more soot and deleterious gases and fumes. The preferred preheater construction is therefore equipped with soot-blowing apparatus, formed as an integral part thereof.

With these and other advantageous features in view, my invention consists of a novel arrangement of parts disclosed more fully in the detailed description following, in conjunction with the accompanying drawings, and defined with more particularity in the appended claims.

In the drawings:

Fig. 2 is a central vertical section through Figure 1;

Fig. 3 is a central transverse section through one preheater unit;

Fig. 4 is an enlarged elevation of one vane with one plate removed;

Fig. 5 is a section therethrough on the line 5—5 of Figure 4;

Fig. 9 is a detail view similar to Fig. 6, but showing a modified arrangement.

It has been found desirable to construct an air preheater as a series of adjacent preheater units, thus providing an extended installation of small width suitable for positioning in back of a boiler or the like, in the path of the flue gases. It has also been found advantageous to mount the valves controlling each unit so as to facilitate common actuation, thus simplifying the necessary actuating mechanism. The following is a detailed description of a preferred preheater arrangement embodying the principles of my invention.

Figure 1:
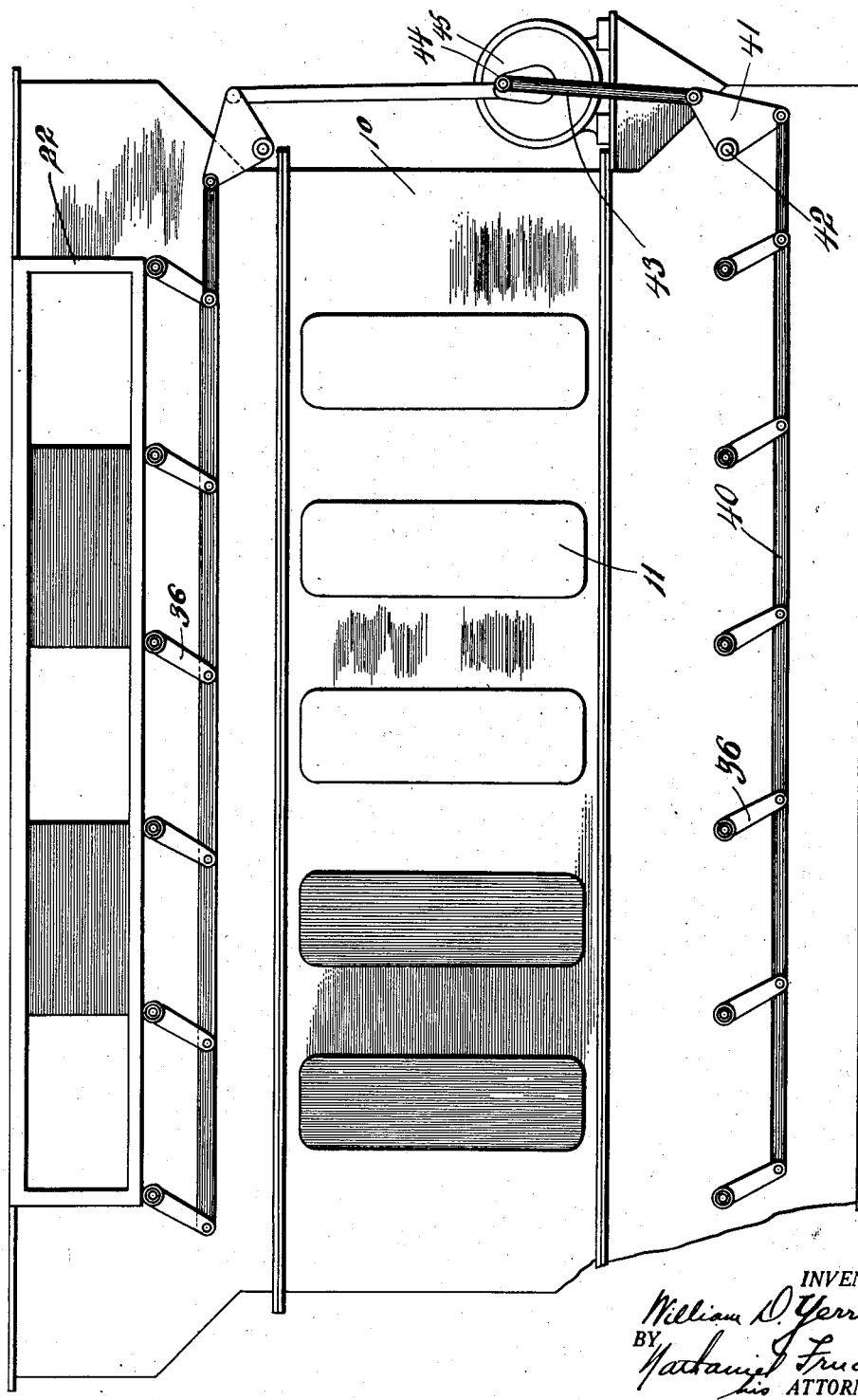
Fig. 1 is a side elevation, partly broken away, of the novel preheater.

The preheater, as shown in Figures 1 and 2, includes a casing 10 which is provided with suitable openings for inspection and repair, normally closed by covers 11. The preheater has a number of fixed vertical partitions 12 between which regenerative material 13 is mounted in any desired manner to provide flow passages for the air and gas, the preferred form comprising regenerative plates which are seated on shoulders or flanges, not shown, on the side walls of the casing. The regenerative material is preferably mounted to present a concave upper and lower surface in each unit, as shown in Figure 2.

The upper wall 14 and the lower wall 15 have vertical standards 16, 17 extending therefrom, positioned intermediate each preheater unit, the standards 16 serving as separating walls between the cold air inlet flow chambers 18 and the cold gas outlet flow chambers 19, and the standards 17 serving as separating walls between the hot gas inlet flow chambers 20 and the hot air outlet flow chambers 21. These inlet and outlet chambers, together with the preheater passages, form air and gas flow passageways which communicate with common manifolds, which are easily mounted on suitable flanges, as shown at 22 in Figures 1 and 3, and are designated as 23, 24, 25 and 26.

Vanes 27 are pivotally mounted in the side walls of the casing, and cooperate with the standards 16 and 17 to form guide ways for the passage of the air and the flue gases through the regenerative material. As indicated in Figure 2, the upper and lower vanes are mounted to swing in parallel alignment, with the free ends of the juxtaposed vanes always substantially in vertical alignment, but not in exact alignment, for the purpose hereinafter described.

Referring now to Figures 3 to 5, the casing 10 is shown as formed of three sections, 28, 29 and 30, having flanges for securing the sections together into a unitary structure. This construction facilitates manufacture, assembly, and repair. The vanes 27 are pivotally mounted in the side walls of the end sections 28, 30, and include an upper horizontal conduit 31, an intermediate vertical conduit 32, a lower horizontal conduit 33, and two cover plates 34 which are mounted over the conduits, as shown in Figure 5. Each conduit 31 has a swivel connection 35 swivelled at one end thereof, and an operating lever 36 secured to and sealing the other end thereof. The conduit 33 is slit at the lower portion thereof, as shown in Figure 5, and a slotted bar 37 is mounted therein, to serve as a nozzle slot for scavenging fluid. Sealing strips 38 are secured to the lower ends of the cover plates 34, and are adapted to sweep over the ends of the regenerative material 13, which as shown in Figure 3 is preferably separated into two portions by a vertical partition 39 to facilitate assembly and repairs. The partitions 16, 17 may have bearing sections to receive the conduits 31, as shown in Figure 2.

The operating mechanism for oscillating the vanes is shown in Figure 1, and includes rods or bars 40 secured to the free ends of the levers 36, and oscillated upon swinging movements of angle plates 41 pivoted to the casing 10 as at 42. The angle plates 41 are swung by rods 43 secured to a crank 44 or the like, adapted to be rotated upon rotation of a suitable motor, not shown, acting through a speed reducer 45.

The operation of the specific preheater above described is as follows:

The hot flue gases enter through the common hot gas inlet manifold, and pass through chambers 20, between the lower guide vanes 27, through selected portions 1 of the regenerative material 13, then between the upper guide vanes 27 and through the outlet chambers 19 to the common outlet manifold. The cold air enters through the air inlet manifold and in a similar manner descends downwardly through chambers 18, between upper vanes 27, through selected portions of the regenerative material, between lower guide vanes 27, and out through hot air outlet chambers 21 and the common outlet manifold. The vanes 27 continually swing over the upper and lower surfaces of the regenerative material, which has the usual through passages formed by the well-known use of alternate flat and corrugated regenerative plates, thus alternately including these through passages in the hot gas and the air flow passageways, the area of the flow passageways remaining constant, and thus providing a constant supply of hot air with no flow interruptions.

As the vanes move, scavenging fluid under pressure, such as steam, may be passed through the conduits of the upper or lower vanes, or both, the upper and lower vanes being slightly displaced to provide free passage of the scavenging fluid. It is usually sufficient to utilize but one set of vanes as scavenging vanes, the scavenging fluid being blown out to form part of the cooled flue gases.

Figure 6:
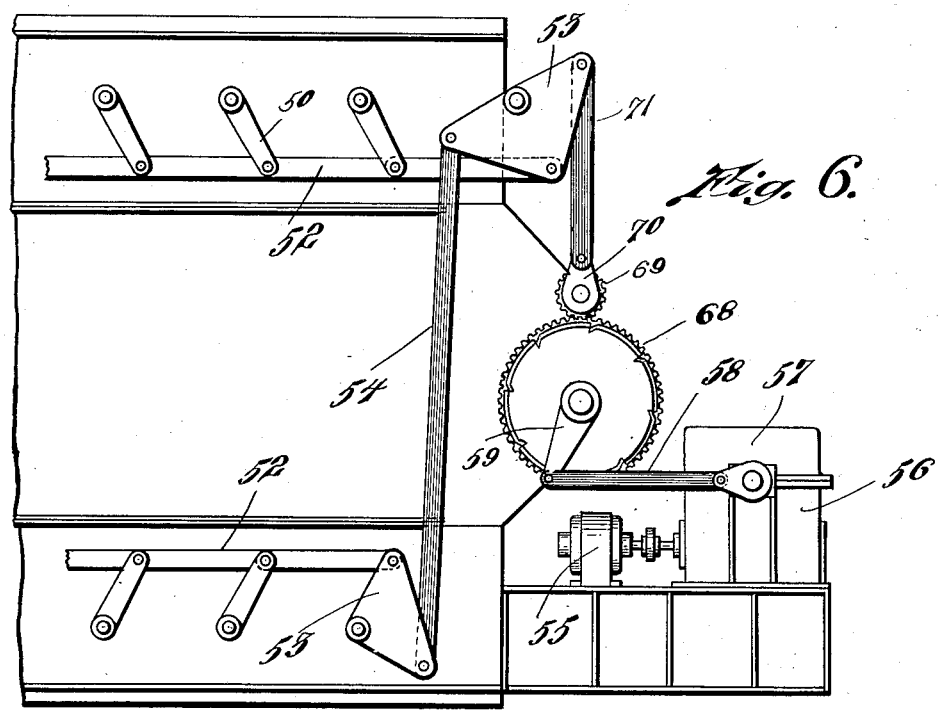
Fig. 6 is a fragmentary elevation of a modified preheater equipped with intermittent actuating mechanism, partly broken away.
Figure 7:
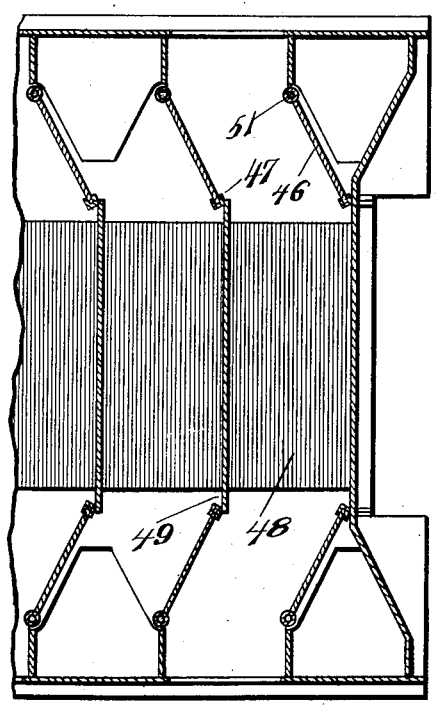
Fig. 7 is a central vertical section through Figure 6.
Figure 8:
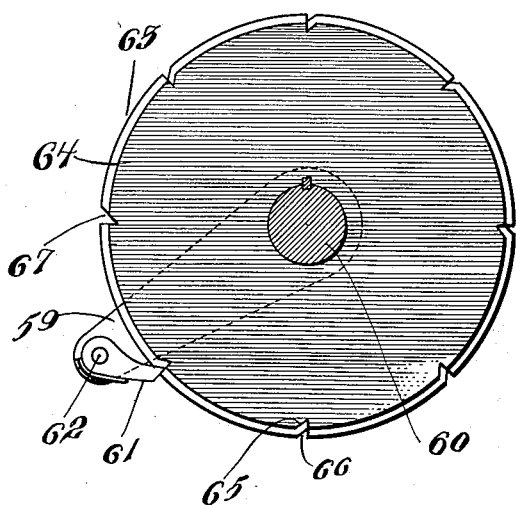
Fig. 8 is an enlarged view of the intermittent reduction mechanism.

Although a slow swinging movement of the vanes 27 is preferred, as such movement maintains a constant flow area, certain installations may require snap movement of the vanes. A construction suitable for this purpose is shown in Figures 6 to 8, the vanes 46 being of the straight plate type, with end buffer pieces 47, and the regenerative material 48 being of uniform height and mounted between separating partitions 49 which extend beyond the regenerative material to be engaged by the buffer pieces 47. The operating mechanism, in this construction, includes levers 50 secured to one end of the shafts 51 of the vanes, swing rods or bars 52 secured to the free ends of the levers 50, angle plates 53 pivoted at one corner to the casing, the two angle plates being connected by a rod 54, and mechanism for intermittently oscillating the upper angle plate including a motor 55, a speed reducer 56, a crank 57 connected by means of a rod 58 to a ratchet lever 59 rotatably mounted on a shaft 60, the ratchet lever having a pawl 61 pivoted thereto as at 62 and rotated by the operating connections to move over two notched disks 63, 64, which are respectively rotatably mounted on and keyed to the shaft 60.

The notches in the disk 64, which is smaller than disk 63, are V-shaped, as indicated at 65; the disk 63 has similar notches 66, which extend only to the rim of the wheel 64, and one double notch 67, into which the pawl 61 extends to also engage with a notch 65 to shift the disk 64 once during a complete rotation of the disk 63. The disk 64, which is keyed to the shaft 60, thus rotates a gear wheel 68 which is also keyed to the shaft 60; a gear wheel 69 is meshed with the gear wheel 68, and rotates a crank 70 which is connected to the upper plate 53 by a connecting rod 71.

The described construction provides a quick movement of the vanes, followed by a long dwell, and thus provides a substantially constant flow of air, with only a momentary interruption of flow during shifting of the vanes. If desired, the ratchet mechanism described may be applied to each shaft 51, in displaced phase, so that the vanes of each unit will shift in succession, by utilizing a plurality of arrangements such as shown in Figs. 6 and 8, with individual plates 53a, 53b, 53c, etc., which are connected to separate levers 50a, 50b, 50c, etc., by means of separate swing bars 52a, 52b, 52c, etc. This construction is of advantage in installations where the capacity of the preheater is greatly in excess of the load.

The air preheater construction described is simple to manufacture, install and repair, may be readily enlarged by adding additional units, occupies very little space in comparison to its load rating, and ensures a substantially constant supply of heated air. While I have described specific embodiments of preheaters, such changes in shape, in arrangement of parts, in operating features, and the like as may be desirable to suit the requirements of individual installations, may obviously be made, within the spirit and the scope of the invention, as defined in the appended claims.

I claim:

1. In an air preheater, a casing, a plurality of adjacent heat transfer chambers in said casing separated by partitions, a plurality of air flow chambers and gas flow chambers mounted in alternate adjacency on each side of said heat transfer chambers and separated by standards, swinging guide vanes mounted on said flow chamber standards and engageable with said separating partitions for alternately guiding the air and the gas through selected heat transfer chambers, mechanism for intermittently swinging said guide vanes, and means on at least some of said swinging vanes for scavenging said heat exchange chambers.

2. In an air preheater, a casing, a plurality of adjacent heat transfer chambers in said casing, a plurality of air flow chambers and gas flow chambers mounted in alternate adjacency on each side of said heat transfer chambers, swinging guide vanes for alternately guiding the air and the gas through selected flow passages of said heat transfer chambers, mechanism for intermittently swinging said guide vanes, and means on at least some of said swinging vanes for scavenging said heat exchange chambers.

3. In an air preheater, a casing, partitions separating the upper and lower portions of said casing into alternate air and gas flow chambers, a plurality of chambers having separating partitions and containing heat exchange material positioned intermediate said casing between said upper and lower flow chambers, swinging vanes forming continuations of said flow chamber partitions and engageable with said separating partitions to alternately communicate said heat exchange chambers with the upper and lower air flow chambers, and the upper and lower gas flow chambers and mechanism for intermittently swinging said guide vanes successively in sequence.

4. In an air preheater, a plurality of heat exchange chambers containing regenerative material, air inlet and outlet manifolds, gas inlet and outlet manifolds, means for alternately communicating said chambers with said air manifolds and said gas manifolds, and means for timing said communication means for the several chambers to operate in sequence.

WILLIAM D. YERRICK.